(12) United States Patent
Boggs et al.

(10) Patent No.: US 9,513,130 B1
(45) Date of Patent: Dec. 6, 2016

(54) VARIABLE ENVIRONMENT HIGH INTEGRITY REGISTRATION TRANSFORMATION SYSTEM AND RELATED METHOD

(71) Applicants: Christopher M. Boggs, Gainesville, VA (US); William T. Kirchner, Fairfax, VA (US); Keith M. Allen, Centreville, VA (US); Gregory J. Kelsey, Cedar Rapids, IA (US); Yingyue Xu, Gainesville, VA (US)

(72) Inventors: Christopher M. Boggs, Gainesville, VA (US); William T. Kirchner, Fairfax, VA (US); Keith M. Allen, Centreville, VA (US); Gregory J. Kelsey, Cedar Rapids, IA (US); Yingyue Xu, Gainesville, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 71 days.

(21) Appl. No.: 14/495,628

(22) Filed: Sep. 24, 2014

(51) Int. Cl.
| | | |
|---|---|---|
| *G01C 21/00* | (2006.01) | |
| *G05D 1/00* | (2006.01) | |
| *G01C 21/16* | (2006.01) | |
| *G05D 1/04* | (2006.01) | |
| *G05D 1/06* | (2006.01) | |
| *G05D 1/08* | (2006.01) | |

(52) U.S. Cl.
CPC ............ *G01C 21/165* (2013.01); *G05D 1/042* (2013.01); *G05D 1/0646* (2013.01); *G05D 1/0808* (2013.01)

(58) Field of Classification Search
None
See application file for complete search history.

(56) References Cited

U.S. PATENT DOCUMENTS

| | | | | |
|---|---|---|---|---|
| 7,693,654 B1 * | 4/2010 | Dietsch | ................ | G01C 21/20 701/461 |
| 2011/0102545 A1 * | 5/2011 | Krishnaswamy | ...... | G01C 21/12 348/46 |

* cited by examiner

*Primary Examiner* — John R Olszewski
*Assistant Examiner* — Gerrad A Foster
(74) *Attorney, Agent, or Firm* — Angel N. Gerdzhikov; Donna P. Suchy; Daniel M. Barbieri

(57) ABSTRACT

A registration solution between two or more sets of point cloud data is provided to register a first target set of point cloud data with a second source set of point cloud data. Through error propagation, degrees of freedom masking and transformation filtering, a system may provide an intelligent method of enabling and disabling degrees of freedom in a real-time registration application. A system may adapt to varying environments (feature-rich and featureless) ensuring a high-integrity registration estimate through providing estimates of the observable parameters. By optionally and iteratively masking zero or more degrees of freedom from the registration estimate, a system may locate desirable data to use in a registration estimate. Then, the system may blend updates from the registration estimates to achieve the best available registration solution applied to the original second source set as well as additional sets of point cloud data.

20 Claims, 6 Drawing Sheets

VARIABLE ENVIRONMENT HIGH INTEGRITY REGISTRATION TRANSFORMATION SYSTEM AND RELATED METHOD

FIELD OF THE INVENTION

Embodiments of the inventive concepts disclosed herein relate generally to the alignment of a first set of data with second set of data. More particularly, embodiments of the inventive concepts disclosed herein relate to a system and related method for high integrity registration of one set of point cloud data to another set of point cloud data in environments of variable physical detail enabling real time location of a vehicle in space.

BACKGROUND

Registration may be described as a process of aligning geographic sensor data (the "source data set") to a known set of reference data (the "target data set"). The source data set may originate from various onboard sensors and, due to the inherent errors in the sensors used to create the source data set, this data may be shifted (x, y, z) and rotated (pitch, roll, yaw) relative to truth data set (trusted to be accurate). The target data set may originate from a trusted database considered accurate within a tolerance. Digital Terrain Elevation Data (DTED) may be one example of a truth data set. A method for registration solution may determine the transformation which may align the erroneous source data set to the reference target data set.

The task of aligning the two independent data sets or streams that are measurements of a three dimensional (3D) environment (additionally, a four dimensional (4D) environment if the environment is time varying) to locate a body in space may remain challenging. Specifically so in instances where specific degrees of freedom are not observable in the transformation from a source data set and target data set. Any registration attempt may be fundamentally limited by the content of the environment being measured. Any six Degrees of Freedom (DOE) (e.g. x, y, z, pitch ($\Theta$), roll ($\phi$), and yaw ($\psi$))) registration solution used to align two flat planes to one another may provide erroneous results for the in-plane, translational degrees of freedom. While this is just one example in which the registration solution does not have observability into specific DOF, other situations that affect any combination of DOF may be constructed.

Recent advances in mobile robot and unmanned vehicle technology have driven rapid development in the broader area of machine vision. A variety of ranging sensors exist that may generate 3D point cloud data. This has led to significant advances in 3D point cloud processing and rendering. While there has been significant advancement in the development of methods to align (or register) point cloud data with a variety of data sources (surface maps, imagery, point cloud data), there remain no accurate solutions to the practical issue of poor point cloud alignment or registration results handled in a real-time application.

Some attempts at point cloud registration may assume a successful registration is possible for each set of corresponding data. In some cases, certain degrees of freedom in the registration problem may be unobservable, or poorly conditioned. One specific instance in which this problem arises is when the 3D environment being measured is completely devoid of features. Applicable here is the above example attempting to register a flat plane with a flat plane realized when operating in a featureless environment that can be approximated as a plane. The result of trying to register unobservable degrees of freedom may be incorrectly computing the location of non-terrain features, which in most cases are the very obstacles that a pilot is trying to avoid. This erroneous positioning of obstacles without proper annunciation that the data is degraded may provide Hazardously Misleading Information (HMI) to the pilot.

Therefore, in a real-time application, a desirable system and method may accommodate varying scanned environments by intelligently enabling/disabling specific degrees of freedom from the registration solution based on an objective measure of environment observability and confidence in the registration solution.

SUMMARY

Accordingly, a system for high integrity registration may include a memory onboard a vehicle, the memory configured for storing a first set of point cloud data and a persistent estimate of a high integrity registration transformation. The system may also include a sensor onboard the vehicle configured for sensing a second set of point cloud data. The system may include a controller operatively coupled to the memory and the sensor configured for determining a high integrity registration transformation solution. The memory may store non-transitory computer readable program code for determining the high integrity registration transformation, the computer readable program code may comprise instructions for causing the processor to perform and direct a plurality of steps.

The plurality of steps may include accessing the first set of point cloud data, receiving the second set of point cloud data, determining a confidence level associated with the persistent estimate. Based on the confidence level associated with the persistent estimate being above a predetermined value, the system may perform an initial registration of the second set of point cloud data via an application of the persistent estimate. Regardless of the confidence level associated with the persistent estimate, the system may determine a first transformation estimate via registration of the second set of point cloud data to the first set of point cloud data, determining a confidence level associated with the first transformation estimate based on an error propagation.

The system may, based on the confidence level associated with the first transformation estimate being below the predetermined value, determine an appropriate number of degrees of freedom to use to determine a second transformation estimate, the appropriate number being one of: six degrees of freedom and less than six degrees of freedom. Based on the determined degrees of freedom to use, the system may determine the second transformation estimate and an associated confidence level based on the appropriate number of degrees of freedom. The system may apply a selected one of the second transformation estimate to update the persistent estimate, the selecting based on the confidence level associated with the second transformation estimate.

The system may update the confidence level associated with the persistent estimate based on the confidence level associated with the selected one of the second transformation estimate. The system may apply the persistent estimate to register of: the first set of point cloud data and an additional set of point cloud data to create a registered set of point cloud data. Finally, the system may present the registered set of point cloud data to a user of the vehicle.

An additional embodiment of the inventive concepts disclosed herein may include a system wherein the first set of point cloud data represents a trusted measurement of a terrain.

An additional embodiment of the inventive concepts disclosed herein may include a system wherein the second set of point cloud data is received from an onboard sensor, the onboard sensor includes a combination of a light detection and ranging sensor, a radar sensor, a long-wave infrared sensor, an inertial measurement unit, a global navigation satellite system sensor, a visible light sensor, and a radio frequency sensor.

An additional embodiment of the inventive concepts disclosed herein may include a system wherein the second set of point cloud data represents an onboard sensor measurement of a terrain proximal with the vehicle.

An additional embodiment of the inventive concepts disclosed herein may include a system wherein the first transformation estimate is a six degree of freedom registration estimate and the second transformation estimate is either a six degree of freedom transformation estimate or a less than six degree of freedom transformation estimate (e.g., 3 DOF solution, 1 DOF solution).

An additional embodiment of the inventive concepts disclosed herein may include a system wherein determining an appropriate number of degrees of freedom to use to determine a second transformation estimate further includes masking a degree of freedom based on computed confidence levels.

An additional embodiment of the inventive concepts disclosed herein may include a system wherein updating the persistent estimate further includes updating a blended covariance associated with each of one of a series of registration estimates.

An additional embodiment of the inventive concepts disclosed herein may include a system wherein the confidence level associated with the first transformation estimate and the second transformation estimate further comprises an accuracy level associated with the terrain proximal with the vehicle.

An additional embodiment of the inventive concepts disclosed herein may include a system wherein the confidence level associated with the persistent estimate is filtered for accuracy.

An additional embodiment of the inventive concepts disclosed herein may include a method for high integrity registration of a point cloud data set. The method may include accessing or receiving a first set of point cloud data and receiving a second set of point cloud data. Should a confidence level associated with a stored persistent estimate be above a predetermined value, the method may perform an initial registration of the second set of point cloud data via an application of the persistent estimate to the second set. Here, the method may apply the aligned second set to an external application.

Next, the method may determine a first transformation estimate via registration of the second set of point cloud data to the first set of point cloud data, and determine a confidence level associated with the first transformation estimate based on an error propagation. Then, based on the confidence level associated with the first transformation estimate below the predetermined value, the method may determine an appropriate number of degrees of freedom to use to determine a second transformation estimate. Here, the appropriate number may be either a six degrees of freedom solution or a less than six degrees of freedom solution.

The method may determine the second transformation estimate and an associated confidence level based on the appropriate number of degrees of freedom, and apply a selected one of the second transformation estimate to update the persistent estimate. The method may select the update based on the confidence level associated with the second transformation estimate. Next, the method may update the confidence level associated with the persistent estimate based on the confidence level associated with the a selected one of the second transformation estimate and apply the persistent estimate to register either of the first set of point cloud data and an additional set of point cloud data to create a registered set of point cloud data. Once the method has aligned the set of point cloud data, it may present the registered set of point cloud data to a user of the vehicle.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Figure 1:
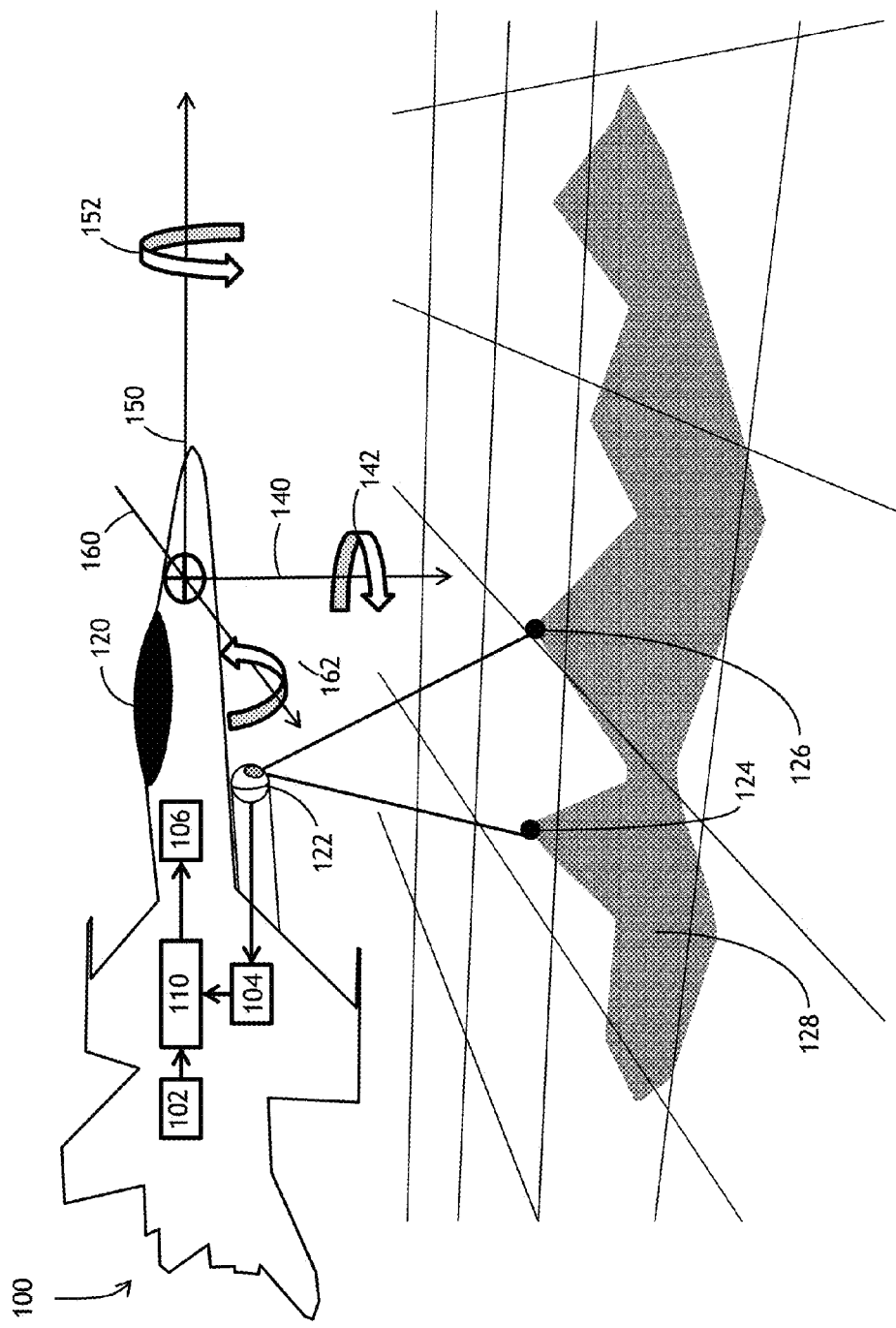
FIG. 1 is a diagram of an exemplary embodiment of a system for variable environment high integrity registration transformation according to the inventive concepts disclosed herein.

Reference will now be made in detail to the presently preferred embodiments of the invention, examples of which are illustrated in the accompanying drawings. The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Embodiments of the inventive concepts disclosed herein may provide a registration solution between two or more sets of point cloud data to accurately associate a first target set of point cloud data with a second source set of point cloud data. Through error propagation, degrees of freedom masking and transformation filtering, systems described herein may provide an intelligent method of enabling and disabling degrees of freedom in a real-time registration application.

A system may adapt to varying environments (feature-rich and featureless) ensuring a high-integrity registration estimate through providing estimates of the observable parameters while masking parameters from those parameters less observable. By optionally and iteratively masking zero or more degrees of freedom from the registration estimate, a system may locate desirable data to use in a registration estimate. Then, the system may blend updates from the registration estimates to achieve the best available registration solution applied to the original second set as well as additional sets of point cloud data

| Reference Chart | |
|---|---|
| Ref. No. | Description |
| 100 | System overview |
| 102 | Target set of point cloud data (First/Static) |
| 104 | Source set of point cloud data (Second/Sensor) |
| 106 | Aligned set of point cloud data |
| 110 | Controller |
| 112 | Error Propagation Module |
| 114 | DOF Masking Module |
| 116 | Transformation Filtering Module |
| 118 | Blended registration transformation data |
| 120 | Vehicle |
| 122 | Onboard Sensor |
| 124 | Sensor field of view first point |
| 126 | Sensor field of view second point |
| 128 | Actual terrain location |
| 140 | Down |
| 142 | Yaw |
| 150 | East |
| 152 | Roll |
| 160 | North |
| 162 | Pitch |
| 200 | System |
| 218 | Memory |
| 220 | Processor |
| 300 | Situation |
| 310 | Actual vehicle location |
| 320 | Sensed vehicle location |
| 332 | Delta x |
| 334 | Delta y |
| 336 | Delta z |
| 338 | Delta Pitch, Theta θ |
| 340 | Delta Roll, Phi φ |
| 342 | Delta Yaw, Psi ψ |
| 352 | Aligned point cloud data sets |
| 360 | Sensed scan location |
| 362 | Sensed first point of sensor field of view |
| 364 | Sensed second point of sensor field of view |
| 370 | Registration |
| 400 | Alignment |
| 500 | Alignment |
| 600 | Method Flow |

| Definitions | |
|---|---|
| LIDAR | Light Detection And Ranging |
| LADAR | Laser Radar |
| LWIR | Long-Wave Infrared |
| ICP | Iterative Closest Point |
| IMU | Inertial Measurement Unit |
| DOF | Degrees Of Freedom |

Referring to FIG. 1, a diagram of an exemplary embodiment of a system 100 for variable environment high integrity registration transformation is shown. An aircraft 120 may be one example of a vehicle the system 100 may operate to locate with reference to a known location. Six degrees of freedom (DOE) including north 160, east 150, down 140, pitch 162, roll 152, and yaw 142 may operate as the degrees of freedom the system 100 may manipulate to achieve a desired registration estimate.

The system 100 may aggregate a source data set 104 from a single source (e.g. a LIDAR point cloud) and register the source data set 104 to a static target data set 102 (e.g., a point cloud static terrain data set) creating a first registration estimate. Then, the system 100 may buffer additional source sets of data (e.g., a second LIDAR point cloud data set in time) and register one of the additional source data sets to the static target set of point cloud data 102 creating a second registration estimate. Repeating the process, the system 100 may create a series of registration estimates, all with an associated covariance which may be blended together within a filtering element.

In some embodiments, the point cloud data may arrive from a plurality of sources both onboard and off-board the vehicle. In one example, the system 100 may register the source data set 104 from the plurality of sources using a persistent transformation estimate determined over time. In another example, the system 100 may register two or more streams of point cloud data received from the onboard sensor 122. In additional embodiments, the system 100 may register point cloud data received from an off-board source using the persistent transformation estimate.

In one embodiment, the system 100 may be employed to georegister a sensed source set of point cloud data 104 to a terrain static target set of point cloud data 102. In this manner, the system 100 may align the sensed data to known or true terrain data.

Embodiments of the system 100 may mask specific degrees of freedom from one or more registration estimates to enable an accurate registration solution of point cloud data while receiving that point cloud data from a featureless environment. In situations of high confidence in the DOF accuracy, the system 100 may use all six DOF to perform a registration solution. In some situations with lesser confidence in particular DOF, the system 100 may use less than the six DOF to perform the registration. One exemplary scenario may include masking, for example, the horizontal or in-plane DOF (north, east, and yaw) to enable at least a three DOF solution as one registration estimate.

In some embodiments, the system 100 may estimate a registration solution between the two sets of point cloud data using data with minimum features within a sensor field of view. In an extreme example, data from a featureless plane may be one example of a data set which the system 100 may perform an accurate registration. In a near featureless example, a confidence level in, for example, a north and east translation of a six DOF solution may be less than the confidence level found where at least some features are present within the sensor field of view.

In one embodiment where features are present within the environment, the system 100 may register real time LIDAR data as the second set of point cloud data 104 against a priori terrain data as the first set of point cloud data 102 to determine a 6DOF solution (a solution using all six degrees of freedom ($\delta_x$, $\delta_y$, $\delta_z$, $\delta_\Theta$, $\delta_\Phi$, $\delta_\Psi$). In some situations, the point cloud data set may not support a 6DOF solution and a reduced solution may be appropriate. In this case, system 100 may estimate using a 3DOF solution based on ($\delta_z$, $\delta_\Theta$, $\delta_\Phi$,) a horizontal plane. The system 100 may determine any subset of the 6DOF solution may operate to create the best solution. Application specific subsets of the 6DOF solution (3DOF, 1DOF) may function to the best performance available.

The system 100 may provide an expected error in each degree of freedom to enable accurate masking of one of the DOF to more accurately establish the confidence level and accurately perform a registration solution. The expected errors may enable the system 100 to determine the confidence level and ultimately determine how accurate the final registration solution may be based on the confidence level.

As opposed to a purely featureless scenario, a more likely scenario may include at least some features within the sensor field of view. In this manner, the system 100 may increase a sensitivity level in certain DOFs to errors in measurements of that certain DOF. Related to confidence levels, as this sensitivity level may increase, the confidence with which the system 100 may rely on the increased sensitivity measurements may decline. For example, in a field of view with many features including mountains and buildings, the system 100 may place a high confidence level in registration solutions based on this data set. Whereas over a featureless desert terrain with slightly rolling hills, the system 100 may place a lower confidence level on this sensed data set and rely less on a registration solution based on such a featureless data set.

In some embodiments, the system 100 may act to select one or more DOF to enable a best available solution. Here, within the sensor field of view, there may be minimal features from which to extract a source data set 104 capable of a highly accurate registration solution. In cases where the source data set may be insufficient, the system 100 may determine a three DOF solution may be appropriate as the best registration solution.

In some embodiments, the system 100 may select specific DOFs to mask or eliminate from a registration estimate based on historical success and also based on the source set of point cloud data 104. For example, in one embodiment, the system 100 may eliminate or mask horizontal DOFs including elimination of the north (y), east (x), and yaw (ψ) to allow for accurate solutions while in an additional embodiment, the system 100 may eliminate one of more other DOF to enable accurate solutions. Preferably, the system 100 may determine and use a six and a three DOF registration estimate retaining the capability to determine and use one or more of the six DOF in additional registration estimates.

In one embodiment focusing on a numerical based analysis, the system 100 may perform a registration estimate and associate a confidence level with each registration estimate. For example, the system 100 may assign a high confidence level to a 6DOF solution while assigning a low confidence level to a 1DOF solution. The system 100 may determine an appropriate number of DOFs to employ based on the error propagation module confidence level/conditioning and historical results to avoid ill-conditioned solutions. The system 100 may select one of the potential solutions (either the full 6DOF or a reduced DOF) to use as an update to the persistent estimate of the transformation solution.

This persistent estimate may employ Kalman Filtering techniques to update the persistent estimate and an associated confidence level in the persistent estimate. The persistent estimate may be used to align the source set of point cloud data 104 as well as all additional data received by the system 100.

Each sensor 122 may possess inherent kinematic errors due to a plurality of factors. The system 100 may receive a position measurement from a sensor and, based on the type of sensor, attribute a confidence in north east down (y, x, z) error to the position measurements from that sensor. For example, in the LIDAR sensor, particular measurements may include azimuth and elevation plus range to a fixed point on the earth. Each LIDAR sensor may possess a set of confidence level values associated with the sensor 122 where the system 100 may apply these confidence level values to the LIDAR measurement source data set 104. The system 100 may assemble a point cloud source data set, and determine a registration estimate between the source data set 104 and a target data set 102 such as a static terrain data set. The registration estimate, whether it includes a six DOF or three DOF estimate, may maintain the associated confidence level which is directly related to both the registration estimates and also the geometry of the measurements.

Once the system 100 determines these registration estimates with associated uncertainties, the system 100 may determine additional properties. First, if the geometry contains enough information to allow a complete six DOF estimation, the system 100 may continue with the six DOF registration estimate. If not, the system 100 may determine masking of one or more DOFs may be appropriate and revert to a three DOF registration estimate. Second, if the source data set 104 does contain enough information for either a six or three DOF estimate, the system 100 may apply a confidence weight to each of the six or three DOF registration estimates in comparison to an estimate produced within recent history to appropriately weight each time based estimate within the Kalman Filter.

Figure 2:
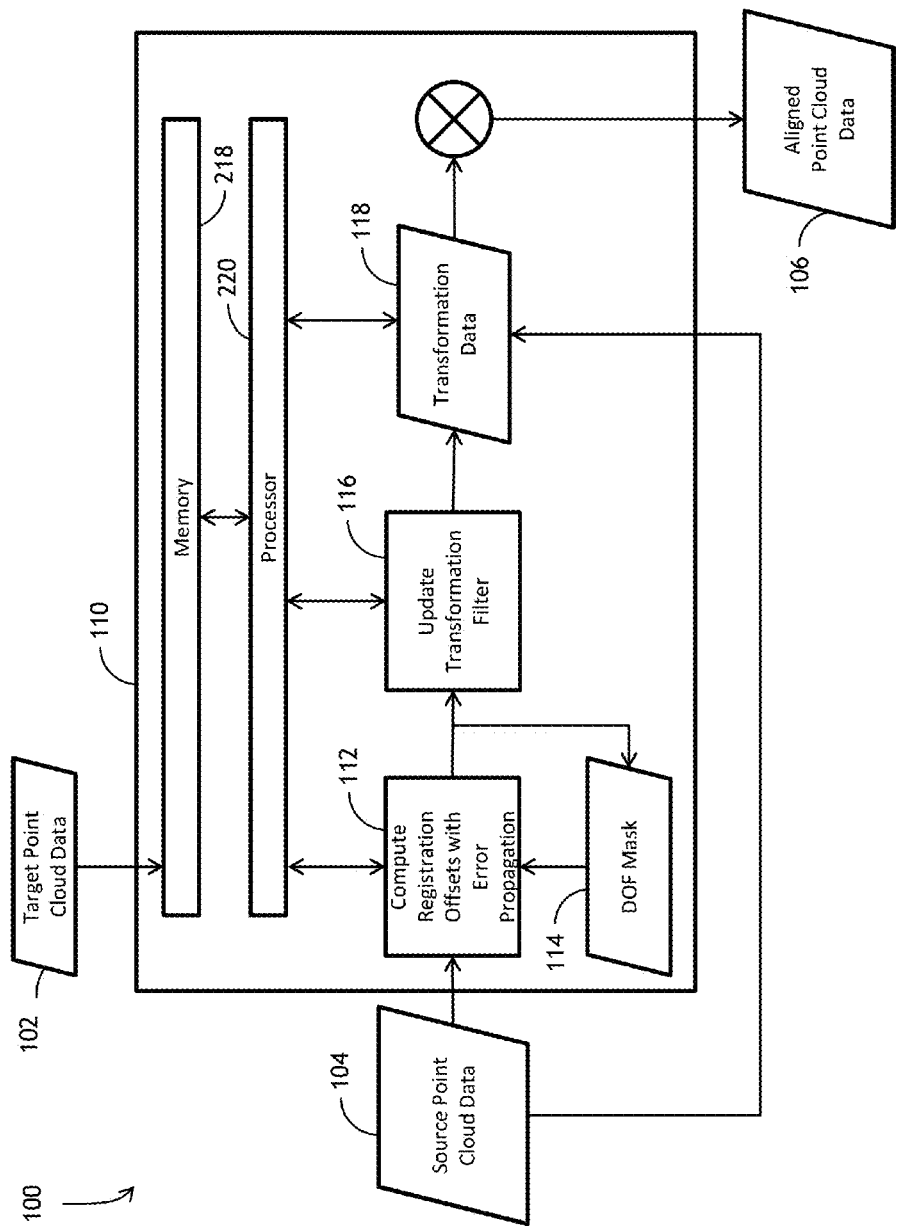
FIG. 2 is a diagram of exemplary detail element of a system for variable environment high integrity registration transformation in accordance with one embodiment of the inventive concepts disclosed herein.

Referring to FIG. 2, a diagram of exemplary detail element of the system 100 for variable environment high integrity registration transformation in accordance with one embodiment of the inventive concepts disclosed herein is shown.

Embodiments of the inventive concepts disclosed herein may include three interrelated components:
1) Error Propagation,
2) DOF Masking, and
3) Transformation Filtering.

The system 100 may indicate one embodiment of the data flow of the inventive concepts disclosed herein. An aggregated source set of point cloud data 104 may be the sensed point cloud data received from the onboard sensor 122 and selected for analysis. Once the source set of point cloud data 104 may be of sufficient size for analysis, the system 100 may query the static terrain database represented by a target set of point cloud data 102 over the same geographical region (plus a margin due to registration errors). Within a controller 110, an error propagation module 112 may compute registration offsets as well as determine a confidence level of the computed registration offsets. DOF masking module 114 may determine if and which DOF may be masked for a particular registration estimate.

Processor 220 may perform computations as directed by the system 100. In some embodiments, the processor 220 may perform the error propagation, the registration offsets, and the confidence levels. Accessing information stored within a memory 218, the processor 220 may provide additional function to the system 100.

Based on the masked DOF registration estimate, the system 100 may update a transformation filtering module 116. In one embodiment, the output of the transformation filtering module 116 may include blended registration transformation data 118. Once the system 100 determines the blended registration transformation data 118, it may apply the transformation data to enable registration of an additional set of point cloud data. For example, once the system 100 determines the blended registration transformation data 118, the system 100 may register the original source set of point cloud data 104 as well as register an additional set of point cloud data (e.g., sensed data later in time) to create an aligned set of point cloud data 106 for further use. Such further use may include application to an onboard mapping presentation as well as configuring the aligned set of point cloud data 106 for further use by an additional application.

For example, should the system 100 determine the source set of point cloud data 104 is two meters distant in each of $\delta_x$, $\delta_y$, $\delta_z$ and 5 degrees distant in each of $\delta_\Theta$, $\delta_\Phi$, $\delta_\Psi$ from the target set of point cloud data 102. As the system 100 receives new data sets from additional sets of point cloud data, each additional set of point cloud data received from the same sensor may be corrected by the determined two meters and 5 degrees to greatly reduce the registration error of the additional sets of point cloud data even before registration is performed on the additional sets of point cloud data. Since these biases may be slowly time varying, a new registration transformation may not be required for registration of each additional set of point cloud data. The system 100 may apply historical transformations to accurately correct newly received data.

As the error propagation module 112 produces each new registration transformation estimate, based on the confidence level of the new transformation estimate, the system 100 may update the transformation filtering module 116 to reflect this newly acquired data. Conversely, should an uncertain update with a low confidence level be available from the error propagation module 112, the system 100 may not update the transformation filtering module 116 to reflect any change in the blended registration transformation data 118 based on this uncertain input.

The memory 218 may operate to store each of the updated transformations where the system 100 may update the blended registration transformation data 118 based on the newly acquired data with a high certainty level as well as from historical transformation data available within the memory 218.

One embodiment may provide an ability to intelligently manage and update the estimate of the transformation required to align the source set of point cloud data 104 to a target (or "truth") set of point cloud data 102. Each set of point cloud data may originate from a variety of ranging devices and/or static (known a priori) databases.

The error propagation module 112 may propagate errors through ICP point to point or point to plane alignment. The output of the error propagation module 112, a six DOF registration estimate and each associated covariance, can then be used downstream. The error propagation module 112 may intelligently disable degrees of freedom and update the registration estimate. In one embodiment, the error propagation module 112 may determine the observability of the six DOF transformation via a condition number of a projection matrix and subsequent Eigen analysis of the same projection matrix.

The presentation of ICP error propagation may proceed as follows. First, an ICP algorithm may be simplified to a nonlinear least-squares optimization problem that identifies a [4×4] transformation matrix that best aligns the point clouds. Linearization of the rotation matrix allows the nonlinear least squares problem to be rewritten as a linear regression. After writing ICP as a linear regression, the system 100 may use standard linear regression techniques to determine the distributions of the estimate and the residuals.

ICP as Nonlinear Least-Squares

For each iteration of ICP, after points are paired, the following nonlinear least-squares problem may be solved:

$$\hat{M} = \underset{M}{\mathrm{argmin}}\left[\sum_{i=1}^{N} \|Ms'_i - d'_i\|^2\right] \quad \text{A.1}$$

Where $s'_i$ and $d'_i$ are the $i^{th}$ paired 4D point for the source and destination point clouds, respectively, and M is the [4×4] transformation matrix from source to destination. Breaking these elements down further:

$$s'_i = [s_{ix}, s_{iy}, s_{iz} 1]^T = [s_i^T 1]^T \quad \text{A.2}$$

$$d'_i = [d_{ix}, d_{iy}, d_{iz} 1]^T = [d_i^T 1]^T \quad \text{A.3}$$

$$M = \begin{bmatrix} R & t \\ 0\ 0\ 0 & 1 \end{bmatrix} \quad \text{A.4}$$

$$t = [\delta_x, \delta_y, \delta_z]^T \quad \text{A.5}$$

Where R is the [3×3] rotation matrix, t is the translation vector, and the x, y, z subscripts indicate a component of the corresponding vector.

Linearization of the Nonlinear Least-Squares Problem

The [3×3] rotation matrix R may be parameterized by three independent Euler angles $\Theta$, $\Phi$, $\Psi$. Using this parameterization of R allows system 100 linearization of the nonlinear least squares problem as a linear least squares problem:

$$r_i(x) = b_i - A(s_i)x \quad \text{A.6}$$

$$x = [\Theta, \phi, \psi, \delta_x, \delta_y, \delta_z]^T \quad \text{A.7}$$

$$\hat{x} = \underset{x}{\mathrm{argmin}}\left[\sum_{i=1}^{N} \|r_i(x)\|^2\right] \quad \text{A.8}$$

Where x contains the six independent parameters that define the [4×4] transformation matrix and $\hat{x}$ is the linear least squares estimate of x.

ICP as Linear Regression

After disclosing ICP as a linear least-squares, a summary of algorithm in the form of a multiple linear regression problem may be presented. The model to fit may include:

$$b_i = A(s_i)x + e_i, \quad i=1,2,\ldots,N \quad \text{A.9}$$

Where $e_i$ is the measurement error for data point i. The vector x may contain the desired true deterministic translation and rotation parameters. Assume the source error cloud may be error-free, and then the input matrix, $A(s_i)$, is also deterministic. In reality, there may be errors on both the source and destination data points, but if this needs to be considered, this could be approximately addressed by inflating the destination point covariance. This leaves the only random variables to be measurement error, $e_i$, which generates the random portion of the output measurement, $b_i$.

Combining all N data points:

$$\begin{bmatrix} b_1 \\ b_2 \\ \vdots \\ b_N \end{bmatrix} = \begin{bmatrix} A(s_1) \\ A(s_2) \\ \vdots \\ A(s_N) \end{bmatrix} x + \begin{bmatrix} e_1 \\ e_2 \\ \vdots \\ e_N \end{bmatrix} \quad \text{A.10}$$

$$b = Ax + e \quad \text{A.11}$$

Assuming the measurement errors are Gaussian distributed with zero mean:

$$e \sim N(0, S_D) \quad \text{A.12}$$

$$S_D = \text{cov}\left(\begin{bmatrix} d_1 \\ d_2 \\ \vdots \\ d_N \end{bmatrix}\right) \quad \text{A.13}$$

At this point, $S_D$ is a generic covariance matrix and has not been assumed to be diagonal (all uncorrelated measurements) or block diagonal (e.g. only correlation within the 3 coordinates of each point). If the measurement noise justifies such an assumption, the simplified covariance matrix may be exploited for numerical efficiency. Also, it may be possible that obscurants may introduce bias errors.

The least-squares estimate of x may be determined using the normal equation:

$$\hat{x} = (A^T A)^{-1} A^T b \quad \text{A.14}$$

Note that this may be the least-squares solution, but it may not be the minimum variance estimate unless $S_D = \sigma^2 I$. Alternate solutions may be constructed by adding a weighting matrix. A unique solution may exist provided $A^T A$ is invertible, which for the 6DOF registration means it has rank of six. If it is not full-rank, the system 100 may determine there may not be enough data to perform an estimate and should flag the estimate as invalid. For the remainder of this section, the system 100 may assume full-rank.

Parameter Estimate Moments and Probability Distribution

The variance of the parameter estimate is $$\Sigma_{\hat{x}} = \text{cov}[\hat{x}] = (A^T A)^{-1} A^T S_D A (A^T A)^{-1} \quad \text{A.15}$$

The covariance matrix, $\Sigma_{\hat{x}}$, may reveal a system 100 confidence in the parameter estimate. Without adequate features in the data to uniquely determine the estimate, $(A^T A)$ may be singular or poorly conditioned. As the system 110 may add more data points with more features, the influence of the data noise, $\sigma$, on the parameter estimate variance may be reduced by an increase in $(A^T A)$.

Since the parameter estimate may be a linear combination of Gaussian random variables, the parameter estimate may also be Gaussian, with mean and variance as derived above.

$$\hat{x} \sim N(x, \Sigma_{\hat{x}}) \quad \text{A.16}$$

The DOF masking module 114 may provide the system 100 the ability to independently mask/disable/enable any combination of degrees of freedom for use by the error propagation module 112. This may allow registration in featureless environments as well as when using lower resolution terrain data. One use for this mask may include disabling horizontal and heading transformations when trying to register a plane (e.g. desert environment) with either featureless terrain data or lower resolution terrain data. This functionality enables the system 100 to successfully register unobservable degrees of freedom.

Constrained ICP may allow definition of the structure of the transform matrix when using a registration class (see definition of M). This may be done by selecting a transformation object using the setTransformationEstimation member function of the registration class. The ICP algorithm may be constrained to register along any combination of the six degrees-of-freedom ($\delta_x$, $\delta_y$, $\delta_z$, $\Theta$, $\Phi$, $\Psi$). The - TransformationMatrix IterativeClosestPoint function may be modified to constrain the registration. Note that this may assume the point clouds being registered are expressed in a local-level coordinate frame (see equation A.4). Here, the system 100 may constrain the transform such that any combination of the DOFs ($\delta_x$, $\delta_y$, $\delta_z$, $\Theta$, $\Phi$, $\Psi$) is constrained to zero when computing M.

An alternative to simply disabling degrees of freedom, one embodiment of the inventive concepts disclosed herein may include weighting the updates for each DOF in the transformation using the estimated covariance calculated as part of the error propagation module 112. The transformation filtering module 116 may recursively update a persistent estimate of the six DOF registration transformation and the transformation covariance. The transformation filtering module 116 may employ a Kalman Filter implemented as a square root filter when it may be possible to make the assumption that the sensor position, attitude and heading errors are correlated in time. This assumption may hold true for GPS-INS navigation filter when using a blended (IMU+ aiding sensors) solution. The transformation filtering module 116 may also allow a lower latency path to be rendered in parallel to the data flow that may be used for registering two point clouds.

One underlying assumption may include that the computed transformations, output from the registration module, may be driven by GPS-INS position and attitude errors. The result may include constant errors for a single scan. In this section, disclosed equations may leverage this assumption when filtering the transformation output from registration. The filter developed in this section is an error based filter with the six DOFs of the transformation comprising the state vector. Starting with the following continuous time system to describe the system 100 change in position and attitude errors in each transformation where below, $x_{ICP}$ (A.19) may be defined as the offset determined by registration.

$$\dot{x} = Ax + Ww \quad \text{A.17}$$

$$z = Cx + v \quad \text{A.18}$$

$$Z = x_{ICP} \quad \text{A.19}$$

$$A = \begin{bmatrix} -1/\tau_x & 0 & 0 & 0 & 0 & 0 \\ 0 & -1/\tau_y & 0 & 0 & 0 & 0 \\ 0 & 0 & -1/\tau_z & 0 & 0 & 0 \\ 0 & 0 & 0 & -1/\tau_\phi & 0 & 0 \\ 0 & 0 & 0 & 0 & -1/\tau_\theta & 0 \\ 0 & 0 & 0 & 0 & 0 & -1/\tau_\psi \end{bmatrix} \quad \text{A.20}$$

$$W = \begin{bmatrix} 1/\tau_x & 0 & 0 & 0 & 0 & 0 \\ 0 & 1/\tau_y & 0 & 0 & 0 & 0 \\ 0 & 0 & 1/\tau_z & 0 & 0 & 0 \\ 0 & 0 & 0 & 1/\tau_\phi & 0 & 0 \\ 0 & 0 & 0 & 0 & 1/\tau_\theta & 0 \\ 0 & 0 & 0 & 0 & 0 & 1/\tau_\psi \end{bmatrix} \quad \text{A.21}$$

$$C = I \quad \text{A.22}$$

It may then be possible to convert the system to discrete time which may result in the final system definition expressed in standard form according to the following equations. It is important to note that since A may be diagonal, computing the matrix exponential to get F may be as simple as taking the exponential of each scalar on the main diagonal of A.

$$x_k = FX_{k-1} + Gw_{k-1} \quad \text{A.23}$$

$$z_k = Hx_{k-1} + V_{k-1} \quad \text{A.24}$$

$$F = e^{At} \quad \text{A.25}$$

$$G = A^{-1}(F-I)W \quad \text{A.26}$$

$$H = I \quad \text{A.27}$$

At this point, one embodiment of the system 100 may employ a Kalman Filter to update the transformation estimate (i.e. $\hat{x}$), where $Q = E[w_k w_k^T]$ may account for the process noise covariance and $R = E[v_k v_k^T]$ may account for the measurement noise covariance.

$$\hat{x}_{k|k-1} = F\hat{x}_{k-1|k-1} \quad \text{A.28}$$

$$P_{k|k-1} = FP_{k-1|k-1}F + GQ \quad \text{A.29}$$

$$K = P_{k|k-1}H^T[HP_{k|k-1}H^T + R]^{-1} \quad \text{A.30}$$

$$\hat{x}_{k|k} = \hat{x}_{k|k-1} + K[z - H\hat{x}_{k|k-1}] \quad \text{A.31}$$

$$P_{k|k} = P_{k|k-1}KHP_{k|k-1} \quad \text{A.32}$$

Figure 3:
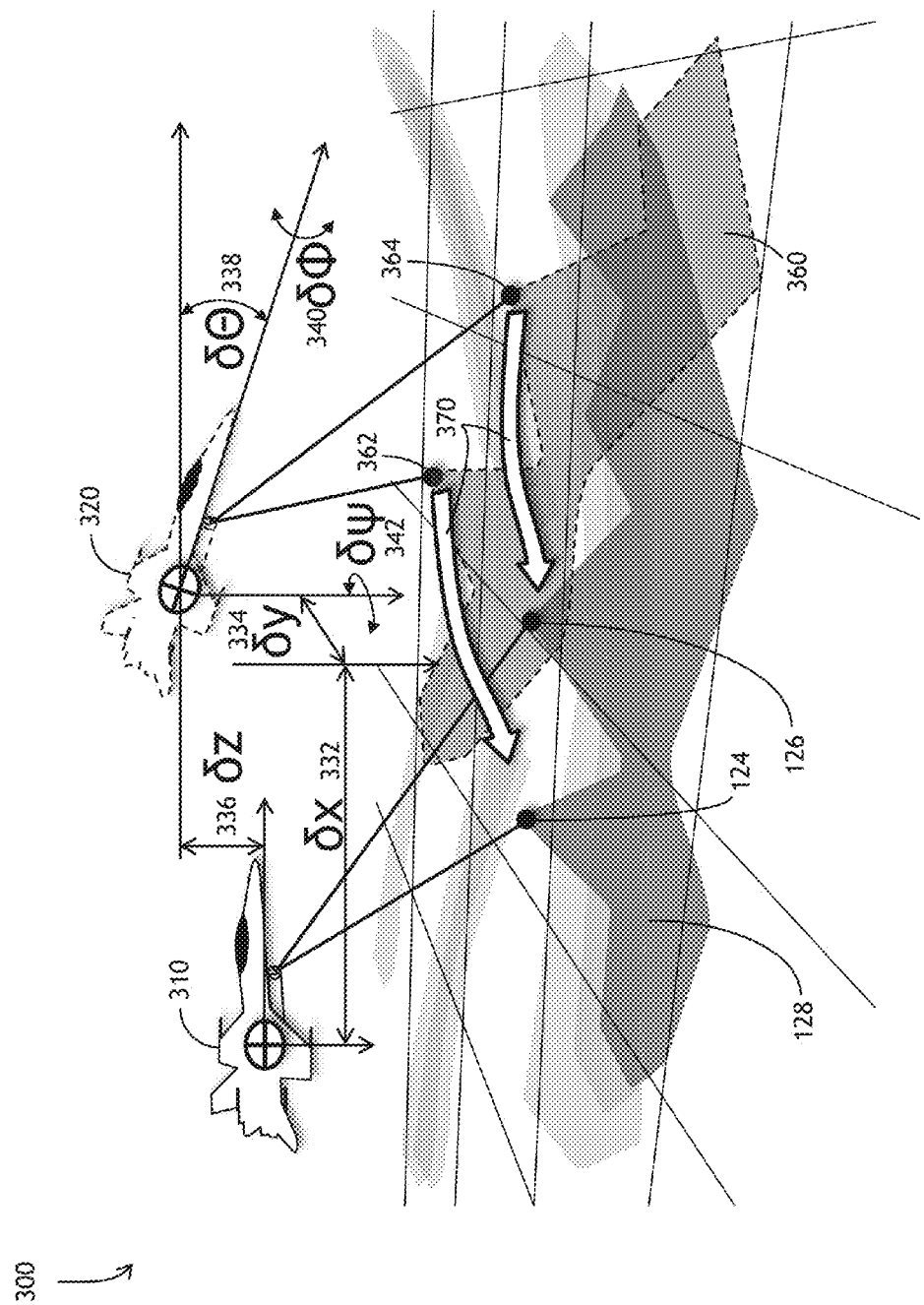
FIG. 3 is a diagram of an environment within which one embodiment of the inventive concepts disclosed herein may operate.

Referring to FIG. 3, a diagram of an environment within which one embodiment of the inventive concepts disclosed herein may operate is shown. A situation 300 may indicate a two dimensional representation of a three dimensional problem. Within the situation 300, the system 100 may operate to determine the registration solution when the onboard sensor 122 may possess errors in location leading to a misaligned sensed set of point cloud data 104. An actual vehicle position 310 may be a point in space where the vehicle may be relative to the target set of point cloud data 102. A sensed vehicle position 320 may be where the sensor indicates the position of the vehicle may be based on errors in the sensor. The sensed set of point cloud data 104 may be the data the system 100 selects for analysis.

In one embodiment, the system 100 may determine an absolute terrain location by registering a set of point cloud data including absolute vehicle location (measured by an onboard Embedded GPS/INS (EGI)) with a set of point cloud data including a relative terrain-vehicle position (e.g., measured by LIDAR). In this manner, all of the DOFs ($\delta_x$, $\delta_y$, $\delta_z$, $\Theta$, $\Phi$, $\Psi$) may be largely driven by EGI errors. Additionally, errors may be present and correctable within the various sensors including the LIDAR.

A difference between the two vehicle positions 310 and 320 may be measureable by the registration offsets within the six degrees of freedom of error (x, y, z, pitch, roll, and yaw). The sensor 122 may provide the sensed location 320 based on the sensor 122 data provided by sensor field of view and indicated by sensed points within sensor field of view 362 and 364. These points may be points of interest upon sensed scan location 360.

The actual vehicle position 310 may be based on where the sensor 122 would sense the field of view if there were zero errors in the sensor 122. A delta in the x $\delta_x$ 332, a delta in y $\delta_y$ 334, a delta in z $\delta_z$ 336 as well as a delta in pitch $\delta_\Theta$ 338, roll $\delta_\Phi$ 340 and yaw $\delta_\Psi$ 342 may be estimated using registration, where the system 100 may estimate all 6DOF or mask select DOFs based on the accuracy of the received point cloud data. The system 100 registration 370 may be one method of aligning the sensed set of point cloud data 104 representing the sensed scan location 360 with the actual terrain location 128.

In some embodiments, the system 100 may be implemented to present the aligned point cloud data to a user of the vehicle on a display. Also, the aligned point cloud data may be available to an additional application for further processing. For example, aligned point cloud data may be employed to update a 3D environment model, to assess proximity of hazards to the vehicle and crew, for path planning, and for mapping of uncertain environments.

Additionally, the registration transformation estimate may be employed for updating a navigation solution (localization), and for aligning additional streams of point cloud data regardless of source. As the system 100 receives new streams of point cloud data, system 100 may apply the high confidence persistent estimate to the new stream of point cloud data to properly align the received data.

Figure 4:
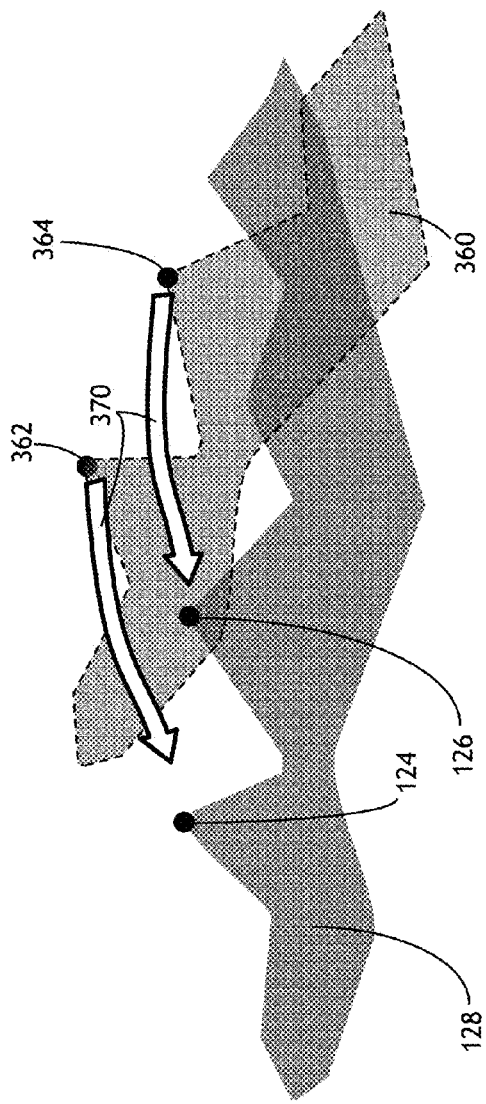
FIG. 4 is an diagram of a registration solution estimate exemplary of one embodiment of the inventive concepts disclosed herein.

Referring to FIG. 4, a diagram of a registration solution estimate exemplary of one embodiment of the inventive concepts disclosed herein is shown. An alignment 400 may indicate the registration 370 where the system 100 may operate to align the sensed set of point cloud data 104 (sensed scan location 360) with the target set of point cloud data 102 (actual terrain location 128).

Figure 5:
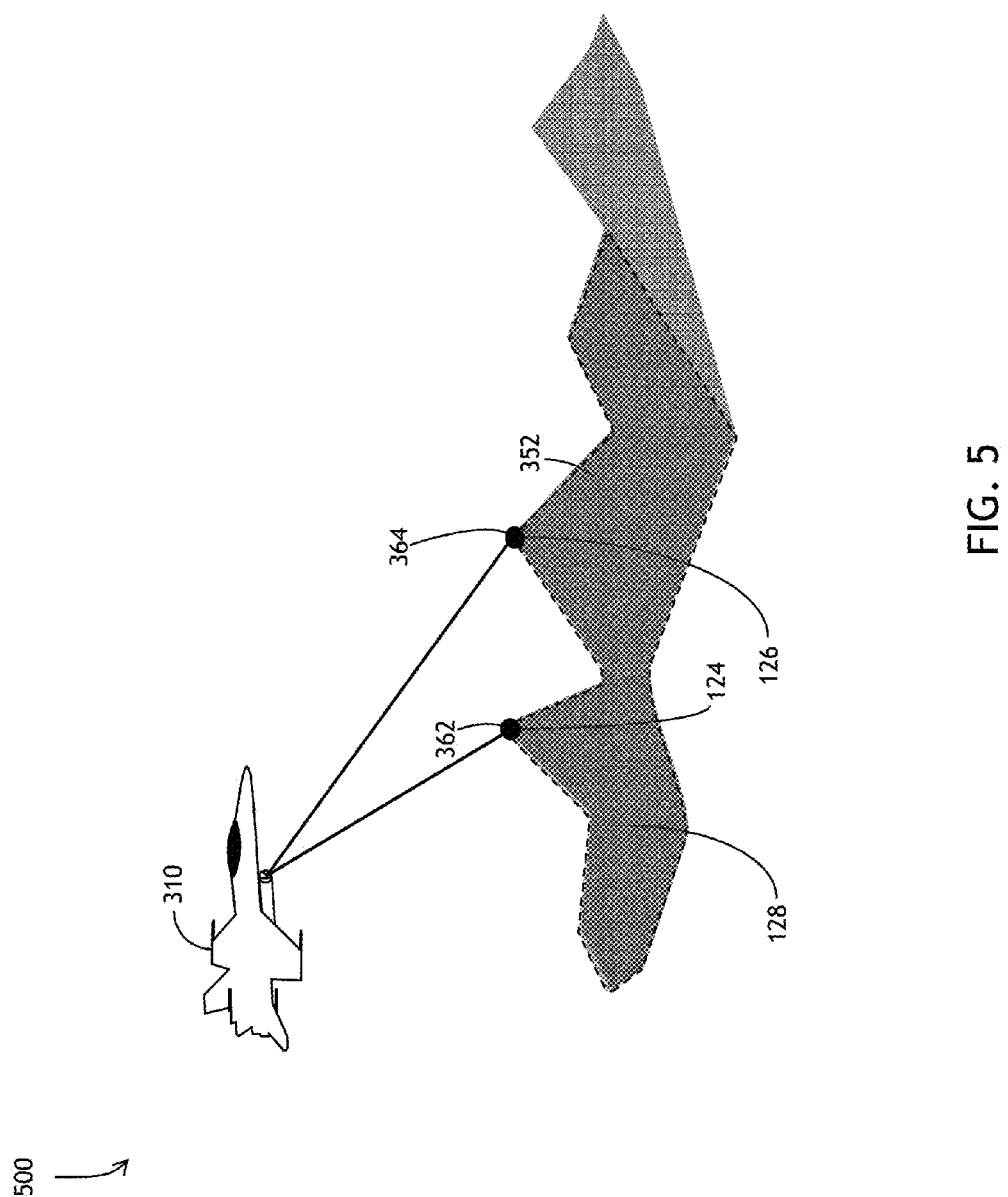
FIG. 5 is a diagram of a registration solution exemplary of one embodiment of the inventive concepts disclosed herein.

Referring to FIG. 5, a diagram of a registration solution exemplary of one embodiment of the inventive concepts disclosed herein is shown. An alignment 500 may indicate the two sets of point cloud data are aligned in an aligned set of point cloud data 352 where sensed points 362 and 364 are aligned with actual points 124 and 126 and sensed scan location 360 (shown in FIG. 4) may be aligned with actual terrain location 128.

Figure 6:
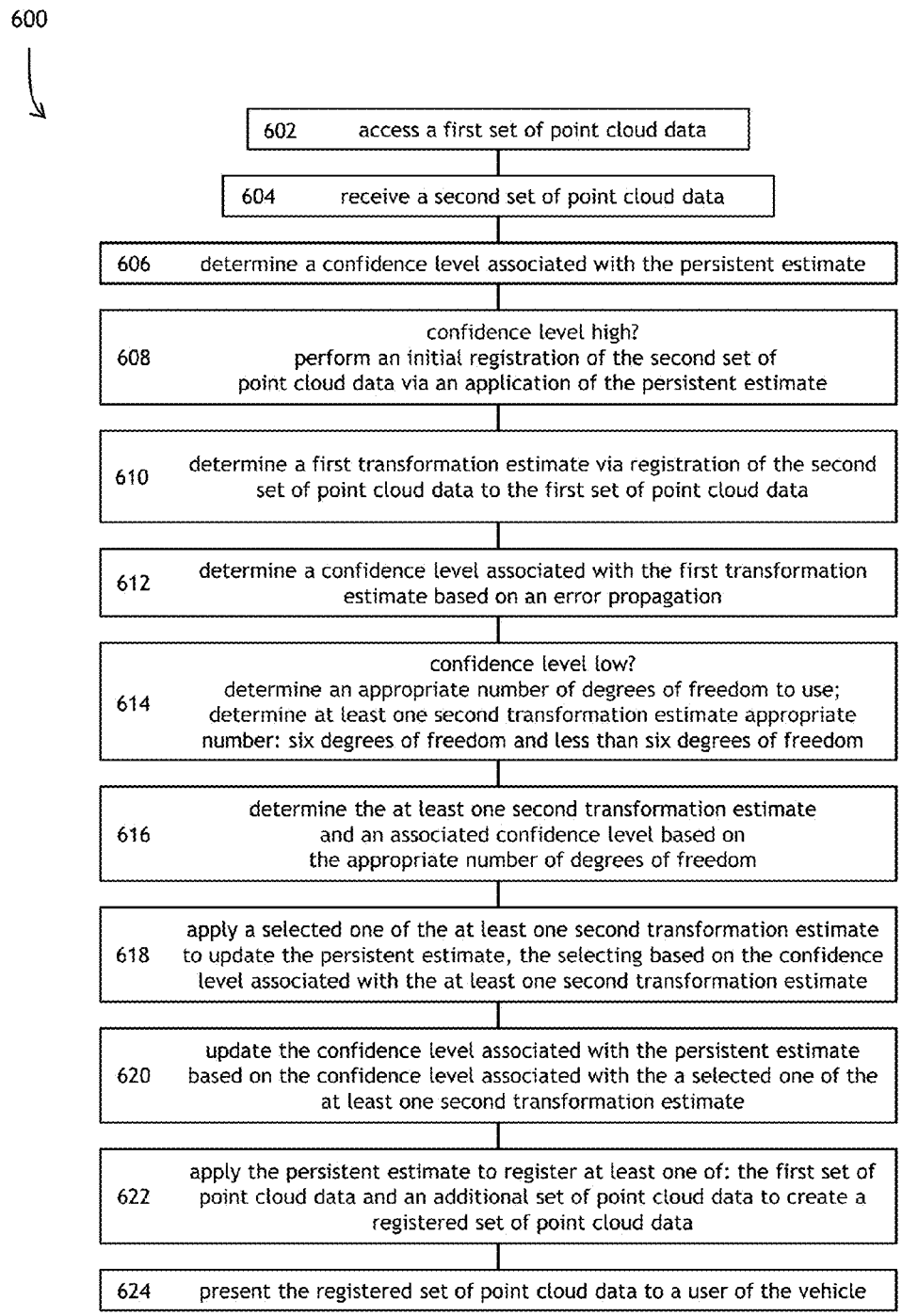
FIG. 6 is a diagram of a method flowchart for variable environment high integrity registration transformation exemplary of one embodiment of the inventive concepts disclosed herein.

Referring to FIG. 6, a diagram of a method flowchart for variable environment high integrity registration transformation exemplary of one embodiment of the inventive concepts disclosed herein is shown. The method 600 may begin at a step 602, with accessing a first set of point cloud data, and at step 604 with receiving a second set of point cloud data. Each set of point cloud data may be stored within the memory. The method 600 may continue at a step 606 with determining a confidence level associated with a stored persistent estimate, and based on this confidence level being above a predetermined value, a step 608 may perform an initial registration of the second set of point cloud data via an application of the persistent estimate. Once this initial registration is complete, the method 600 may present this aligned data to a user of a vehicle.

The method 600 may continue at a step 610 with determining a first transformation estimate via registration of the second set of point cloud data to the first set of point cloud data and at a step 612 also determining a confidence level associated with the first transformation estimate based on an error propagation. At a step 614 the method 600 may, based on the confidence level associated with the first transformation estimate being below the predetermined value, determine an appropriate number of degrees of freedom to use to determine at least one second transformation estimate, the appropriate number being one of: six degrees of freedom and less than six degrees of freedom.

The method 600 may continue at step 616 with determining the at least one second transformation estimate and an associated confidence level based on the appropriate number of degrees of freedom, and at a step 618, the method 600 may apply a selected one of the at least one second transformation estimate to update the persistent estimate, the selecting based on the confidence level associated with the at least one second transformation estimate. Next the method 600 may update the confidence level associated with the persistent estimate based on the confidence level associated with the a selected one of the at least one second transformation estimate at a step 620, and at a step 622, the method may apply the persistent estimate to register at least one of: the first set of point cloud data and an additional set of point cloud data to create a registered set of point cloud data. Finally, the method 600 may conclude with a step 624 of presenting the registered set of point cloud data to a user of the vehicle.

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for iterative closest point registration to accurately determine a position of a vehicle in a substantially featureless environment, comprising:
   a memory onboard a vehicle, the memory configured at least for storing a first set of point cloud data, a persistent estimate and computer executable program code;
   a sensor onboard the vehicle configured for sensing a second set of point cloud data;
   a controller operatively coupled to the memory and the sensor, the controller configured for executing the computer readable program code, the computer readable program code comprising instructions for causing the controller to perform and direct the steps of:
      accessing the first set of point cloud data from the memory;
      receiving the second set of point cloud data from the sensor;
      determining a first transformation estimate via registration of the second set of point cloud data to the first set of point cloud data;
      determining a confidence level associated with the first transformation estimate based on an error propagation, the error propagation resulting from measurement error of the sensor;
      based on the confidence level associated with the first transformation estimate being below a predetermined value due to a reduced number of features accurately sensed by the sensor, determining an appropriate number of degrees of freedom to use to determine at least one second transformation estimate, the appropriate number being one of: six degrees of freedom and less than six degrees of freedom;
      updating the persistent estimate using the at one second transformation estimate with the appropriate number of degrees of freedom; and
      determining the position of the vehicle using the registered set of point cloud data according to the updated persistent estimate and the at least one second transformation estimate, the position for presentation to a display or an additional processing system of the vehicle.

2. The system of claim 1, wherein the position is a second position, and wherein the controller is further configured to perform or direct the steps of:
   determining a confidence level associated with the persistent estimate;
   determining a confidence level associated with the at least one second transformation estimate;
   based on the confidence level associated with the persistent estimate being above the predetermined value, determining a first position of the vehicle using the registered set of point cloud data according to the persistent estimate and the first transformation estimate, the first position for presentation to the display or for the additional processing system of the vehicle;
   updating the confidence level associated with the persistent estimate based on the confidence level associated with the at least one second transformation estimate; and
   based on the confidence level associated with the updated persistent estimate being above the predetermined value, performing an initial registration of an additional set of point cloud data received from the sensor via registration of the additional set of point cloud data with the first set of point cloud data or with another set of point cloud data from memory.

3. The system of claim 1, wherein the first set of point cloud data represents a trusted measurement of a terrain, and wherein the second set of point cloud data is received from an onboard sensor, the onboard sensor includes a combination of at least: a light detection and ranging sensor, a radar sensor, a long-wave infrared sensor, an inertial measurement unit, a global navigation satellite system sensor, a visible light sensor, and a radio frequency sensor.

4. The system of claim 1, wherein the second set of point cloud data represents an onboard sensor measurement of a terrain proximal with the vehicle, wherein proximal is based upon a range of the onboard sensor performing the measurement, and wherein the measurement error of the sensor is a result of an inaccurately measured feature or one or more features being eliminated from a field of view of the sensor.

5. The system of claim 1, wherein the first transformation estimate is a six degree of freedom registration estimate and the at least one second transformation estimate is one of a six degree of freedom transformation estimate and a less than six degree of freedom transformation estimate, and wherein the persistent estimate is vector or matrix solution to a linearized representation of a non-linear function, the non-linear function provided as follows:

$$\hat{M} = \underset{M}{\operatorname{argmin}}\left[\sum_{i=1}^{N}\|Ms'_i - d'_i\|^2\right]$$

wherein $s'_i$ and $d'_i$ are the $i^{th}$ paired point for the first set of point cloud data (destination) and the second set of point cloud data (source), respectively, and M is a transformation estimate from source to destination, wherein $$s'_i = [s_{ix}, s_{iy}, s_{iz}1]^T = [s_i^T 1]^T$$

$$d'_i = [d_{ix}, d_{iy}, d_{iz}1]^T = [d_i^T 1]^T$$

$$M = \begin{bmatrix} R & t \\ 0 & 0 & 0 & 1 \end{bmatrix}$$

$$t = [\delta_x, \delta_y, \delta_z]^T$$

are representative of the respective parameters in the non-linear function, and wherein R is the [3×3] rotation matrix, t is the translation vector, and the x, y, z subscripts indicate a component of a corresponding vector.

6. The system of claim 1, wherein determining an appropriate number of degrees of freedom to use to determine at least one second transformation estimate further includes masking at least one degree of freedom based on computed confidence levels.

7. The system of claim 1, wherein updating the persistent estimate further includes updating a blended covariance associated with each of one of a series of registration estimates.

8. The system of claim 1, wherein the confidence level associated with the persistent estimate is filtered for a accuracy, wherein the confidence level associated with one of the first transformation estimate and the at least one second transformation estimate further comprises an accuracy level associated with a second absolute position of the vehicle determined using a first absolute position of the vehicle and a relative position of the vehicle, the relative position being relative to the terrain proximal with the vehicle, and wherein proximal is based upon a range of the onboard sensor utilized in performing the measurement.

9. The system of claim 1, wherein the position is used for localization of the vehicle, updating a 3D environment model related to the vehicle, assessing proximity hazards to a crew of the vehicle, or path planning for the vehicle.

10. A method for iterative closest point (ICP) registration to determine a position of a vehicle in a substantially featureless environment, comprising:
accessing a first set of point cloud data from a memory of a vehicle;
receiving a second set of point cloud data from a sensor of the vehicle;
determining a first transformation estimate via registration of the second set of point cloud data to the first set of point cloud data;
determining a confidence level associated with the first transformation estimate based on an error propagation, the error propagation resulting from measurement error of the sensor;
based on the confidence level associated with the first transformation estimate being below the predetermined value due to a reduced number of features accurately sensed by the sensor, determining an appropriate number of degrees of freedom to use to determine at least one second transformation estimate, the appropriate number being one of: six degrees of freedom and less than six degrees of freedom;
determining the at least one second transformation estimate and an associated confidence level based on the appropriate number of degrees of freedom;
updating the persistent estimate using the at least one second transformation estimate, the updating based on the confidence level associated with the at least one second transformation estimate;
and
determining the position of the vehicle using the registered set of point cloud data according to the updated persistent estimate and the at least one second transformation estimate and presenting the position to a display of the vehicle.

11. The method of claim 10, wherein the position is a second position, the method further comprising: determining a confidence level associated with the persistent estimate; determining a confidence level associated with the at least one second transformation estimate; based on the confidence level associated with the persistent estimate being above the predetermined value, determining a first position of the vehicle using the registered set of point cloud data according to the persistent estimate and the first transformation estimate, the first position for presentation to the display or for the additional processing system of the vehicle; updating the confidence level associated with the persistent estimate based on the confidence level associated with the at least one second transformation estimate; and based on the confidence level associated with the updated persistent estimate being above the predetermined value, performing an initial registration of an additional set of point cloud data received from the sensor via registration of the additional set of point cloud data with the first set of point cloud data or with another set of point cloud data from memory.

12. The method of claim 10, wherein the first set of point cloud data represents a trusted measurement of a terrain, and wherein the second set of point cloud data is received from an onboard sensor, the onboard sensor is a combination of at least: a light detection and ranging sensor, a radar sensor, a long-wave infrared sensor, an inertial measurement unit, a global navigation satellite system sensor, a visible light sensor, and a radio frequency sensor.

13. The method of claim 10, wherein the second set of point cloud data represents an onboard sensor measurement of a terrain proximal with the vehicle, wherein proximal is based upon a range of the onboard sensor utilized in performing the measurement.

14. The method of claim 10, wherein first transformation estimate is a six degree of freedom registration estimate and the at least one second transformation estimate is a less than six degree of freedom transformation estimate.

15. The method of claim 10, wherein determining an appropriate number of degrees of freedom to use to determine the at least one second transformation estimate further includes masking at least one degree of freedom based on computed confidence levels when the appropriate number is determined to be less than six degrees of freedom, and wherein determining an appropriate number of degrees of freedom to use to determine the at least one second transformation estimate further includes weighting the degrees of freedom and Kalman filtering when the appropriate number is determined to be six degrees of freedom.

16. The method of claim 10, wherein updating the persistent estimate further includes updating a blended covariance matrix associated with each of one of a series of registration estimates.

17. The method of claim 10, wherein the confidence level associated with one of the first transformation estimate and the at least one second transformation estimate further comprises an accuracy level associated with a position of the vehicle relative to the terrain proximal with the vehicle, wherein proximal is based upon a range of the onboard sensor utilized in performing the measurement.

18. The system of claim 11, wherein the confidence level associated with the persistent estimate is Kalman filtered for accuracy.

19. A system for iterative closest point (ICP) registration, comprising:
   a memory onboard a mobile platform, the memory configured to store a first set of point cloud data, a persistent estimate and computer readable program code;
   a sensor onboard the mobile platform configured for sensing a second set of point cloud data;
   a controller operatively coupled to the memory and the sensor, the controller configured for executing the computer readable program code, the computer readable program code comprising instructions for causing the controller to perform and direct the steps of:
      performing two or more ICP registration iterations, wherein a first ICP registration iteration comprises:
         accessing the first set of point cloud data from the memory;
         receiving the second set of point cloud data from the sensor;
         determining a first transformation estimate via registration of the second set of point cloud data to the first set of point cloud data;
         determining a confidence level associated with the first transformation estimate based on an error propagation, the error propagation resulting from measurement error of the sensor;
         based on the confidence level associated with the first transformation estimate being below a predetermined value, determining an appropriate number of degrees of freedom to use to determine at least one second transformation estimate, the appropriate number being one of: six degrees of freedom and less than six degrees of freedom,
      wherein a second ICP registration iteration comprises:
         updating the persistent estimate using the at one second transformation estimate with the appropriate number of degrees of freedom, wherein updating the persistent estimate includes masking a degree of freedom or giving less weight to the degree of freedom; and
         determining an absolute position of the mobile platform using the registered set of point cloud data according to the updated persistent estimate and the at least one second transformation estimate, the absolute position for presentation to a display or an additional processing system of the mobile platform.

20. The system of claim 19,
wherein the second ICP registration iteration further comprises receiving a third set of point cloud data from the sensor, the at least one second transformation estimate based on a registration of the third set of point cloud data with the first set of point cloud data,
wherein the mobile platform comprises an aircraft,
wherein the persistent estimate is based on a linearized representation of a non-linear function solved using Kalman filtering techniques,
wherein solving using Kalman filtering techniques determines a vector or matrix of values at which a difference function is minimized, the difference function being a difference between the second set of point cloud data and the first set of point cloud data, the second set of point cloud data having received a transformation prior to taking the difference between the sets of point cloud data, and
wherein the absolute position of the aircraft is based on the vector or the matrix of values.

* * * * *